(12) United States Patent
Chen et al.

(10) Patent No.: US 8,407,720 B1
(45) Date of Patent: Mar. 26, 2013

(54) INTER-PROCESS COMMUNICATION MANAGEMENT

(75) Inventors: Peter Chen, Charlton, MA (US); Scott E. Joyce, Foxboro, MA (US); Gregory W. Lazar, Upton, MA (US); Robert A. Ballantyne, Mansfield, MA (US); Bryant C. Martin, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 469 days.

(21) Appl. No.: 12/751,008

(22) Filed: Mar. 31, 2010

(51) Int. Cl.
*G06F 13/00* (2006.01)

(52) U.S. Cl. .......................... 719/313; 709/227; 709/229

(58) Field of Classification Search .................. 719/313; 709/227, 229
See application file for complete search history.

(56) References Cited

U.S. PATENT DOCUMENTS

| | | | |
|---|---|---|---|
| 6,092,066 A * | 7/2000 | Ofek | 707/999.01 |
| 6,718,372 B1 | 4/2004 | Bober | |
| 7,080,225 B1 | 7/2006 | Todd | |
| 7,272,715 B2 * | 9/2007 | Sueyoshi et al. | 713/156 |
| 7,325,038 B1 * | 1/2008 | Wang | 709/216 |
| 7,376,764 B1 | 5/2008 | Todd | |
| 8,122,457 B2 * | 2/2012 | Wiseman et al. | 719/315 |
| 8,250,317 B2 * | 8/2012 | Satoyama et al. | 711/154 |
| 8,291,094 B2 | 10/2012 | Bopardikar et al. | |
| 2006/0064398 A1 * | 3/2006 | Koenigstein | 707/1 |
| 2010/0080090 A1 * | 4/2010 | Spivak et al. | 369/30.28 |

* cited by examiner

*Primary Examiner* — Andy Ho
(74) *Attorney, Agent, or Firm* — BainwoodHuang

(57) ABSTRACT

Inter-process communication management allows a first data storage system management application to execute a second data storage system management application. For example, when a user directs a client device to execute a second application while executing a first application, the client device establishes an inter-process communication (IPC) channel between the two applications to allow for security and navigation commands to be passed from the first application to the second application. With such a configuration, the first application does not require the user to re-enter information, such as a target IP address, and encrypted password to execute the second application. In one arrangement, the IPC channel is configured to detect the termination of either the first or the second application. Once detected, the client device can safely terminate the IPC channel between the two applications and execute the remaining, non-terminated application as a standalone product.

20 Claims, 4 Drawing Sheets

INTER-PROCESS COMMUNICATION MANAGEMENT

BACKGROUND

A typical data storage system stores and retrieves data for one or more external client devices. Conventional data storage systems typically include a storage processor and an array of disk drives electrically coupled to the storage processor. The storage processor includes one or more ports, such as fibre channel ports, that allow the client devices to connect to the storage processor and is typically configured to perform load and store operations on the array of disk drives on behalf of the client devices.

Conventional data storage systems also allow the client devices to manage, monitor, and configure the data storage system according to a user's needs. For example, a client device can manage and monitor a CLARiiON™ data storage system, as produced by EMC Corporation of Hopkinton, Mass., using a first application such as the Navisphere Manager, also produced by EMC Corporation. The client device can also update, install, and maintain hardware and applications associated with the data storage system utilizing a second application, such as the Navisphere Service Taskbar (NST), as produced by EMC Corporation. While these management applications are related, the client device maintains the Navisphere Manager and the NST as separate applications. Such separation allows each application to be independently upgraded over time and across different updating schedules.

SUMMARY

With respect to conventional data storage systems, in the case where the user wants to launch related but separate data storage system management applications, such as Navisphere Manager and NST, the user would have to minimize or close one application before launching the second application. For example, when the client device executes the Navisphere manager, the client device first obtains a target Internet Protocol (IP) address of the data storage system as well as an encrypted password from a user. The Navisphere manager then authenticates the client device with the data storage system associated with the IP address using the encrypted password. Once authenticated, the client device can manage and monitor the associated data storage system via the Navisphere manager. In the case where the user wants to update or install an application associated with the data storage system, for example, the user is required to close the Navisphere manager to stop execution of the Navisphere manager application and launch the NST application. As the client device executes the NST application, the client device requires the end user to re-enter the target IP address of the data storage system as well as the encrypted password. The NST application then authenticates the client device with the data storage system associated with the IP address using the encrypted password. Once authenticated, the client device can update or install an application associated with the data storage system via the NST application.

While conventional data storage systems allow a user to launch related but separate data storage system management applications, such as Navisphere Manager and NST, these data storage systems require the user to re-enter information, such as a username, target IP address, and encrypted password. Such a requirement is needlessly time consuming, and unnecessary if the end user is attempting to validate a second application, such as the NST application, against the same storage system managed by the first application, such as the Navisphere Manager. Additionally, when a user wants to launch related management applications such as Navisphere Manager and NST, specifically ones that are closely related, conventional data storage systems require the user to minimize or close one application before launching the second. Such a requirement can be non-intuitive and can cause some confusion regarding the compatibility of the applications to the user.

By contrast to conventional applications, embodiments of the invention relate to inter-process communication management that allows a first data storage system management application to execute a second data storage system management application. For example, when a user directs a client device to execute a second data storage system management application, such as an NST application, while executing a first data storage system management application, such as Navisphere Manager, the client device establishes an inter-process communication (IPC) channel between the two applications to allow for security and navigation commands to be passed from the first application to the second application. With such a configuration, the first data storage system management application does not require the user to re-enter information, such as a username, target IP address, and encrypted password to execute the second data storage system management application. In one arrangement, the IPC channel is configured to detect the termination of either the first or the second data storage system management application. Once detected, the client device can safely terminate the IPC channel between the two data storage system management applications and execute the remaining, non-terminated application as a standalone product. With such a configuration, IPC channel provides the ability for the client device to launch a second data storage system management application from an already executing first data storage system management application to provide the user a better ease-of-use experience.

One embodiment is directed to a method for managing a data storage system. The method includes executing, by a client device, a first data storage system management application, receiving, by the client device, an execution instruction for execution of a second data storage system management application, and establishing, by the client device and in response to receiving the execution instruction, an inter-process communication channel between the first data storage system management application and the second data storage system management application. The method includes providing, by the client device, data storage system information utilized by the first data storage system management application to the second data storage system management application via the inter-process communication channel and executing, by the client device, the second data storage system management application to establish communication with the data storage system utilizing the data storage system information.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to inter-process communication management that allows a first data storage system management application to execute a second data storage system management application. For example, when a user directs a client device to execute a second data storage system management application, such as an NST application, while executing a first data storage system management application, such as Navisphere Manager, the client device establishes an inter-process communication (IPC) channel between the two applications to allow for security and navigation commands to be passed from the first application to the second application. With such a configuration, the first data storage system management application does not require the user to re-enter information, such as a username, target IP address, and encrypted password to execute the second data storage system management application. In one arrangement, the IPC channel is configured to detect the termination of either the first or the second data storage system management application. Once detected, the client device can safely terminate the IPC channel between the two data storage system management applications and execute the remaining, non-terminated application as a standalone product. With such a configuration, IPC channel provides the ability for the client device to launch a second data storage system management application from an already executing first data storage system management application to provide the user with a better ease-of-use experience.

Figure 1:
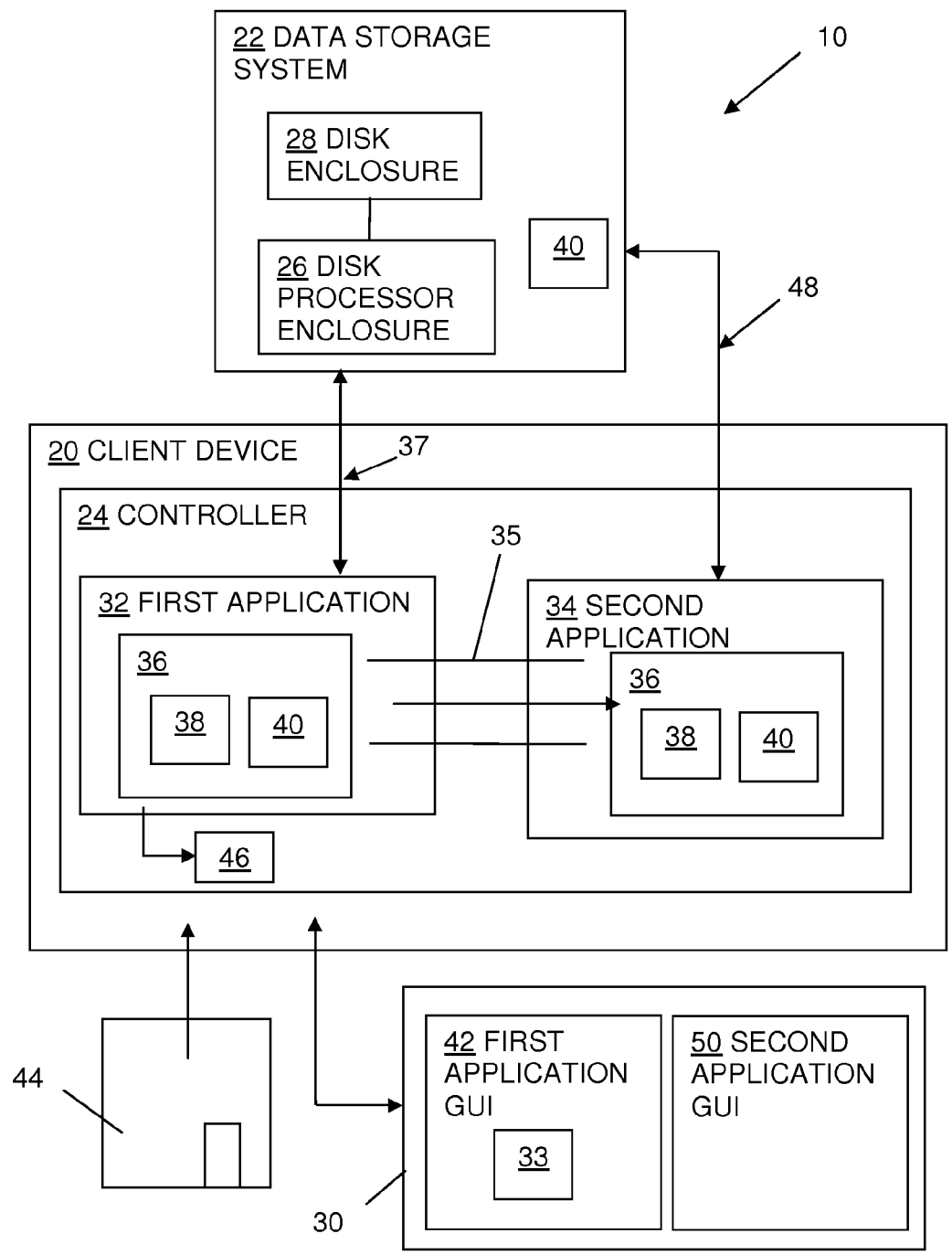
FIG. 1 illustrates a schematic representation of a data storage environment, according to one embodiment.

FIG. 1 illustrates an example arrangement of a data storage environment 10, such as used by an enterprise. As shown, the data storage environment 10 includes a client device 20 disposed in electrical communication with a data storage system 22, such as via a network connection.

The data storage system 22, in one arrangement, includes a disk processor enclosure 26 and one or more disk enclosures 28 electrically coupled to the disk processor enclosure 26. Each of the disk enclosures 28 includes an array of magnetic memory units, such as disk drives or flash drives. For example, each of the disk enclosures 28 includes several disk drives operable to store data received from the client device 20 or to provide data requested from the client device 20. The disk processor enclosure 26 includes one or more controllers or storage processors configured to control certain functions of the data storage system 22. For example, the storage processor is configured to perform load and store operations on the magnetic storage devices of the disk enclosures 28 on behalf of the client device 20. While the data storage system 22 can be configured in a variety of ways, in one arrangement, the data storage system 22 is configured as a storage area network, such as a CLARiiON™ system The client device 20, such as a computerized device, includes a controller 24, such as a memory and a processor. The controller 24 of the client device 20 is configured to execute a first data storage system management application 32 and a second data storage system management application 32. In one arrangement, the first and second data storage system management applications 32, 34 are based on a common code infrastructure, such as applications produced by EMC Corporation of Hopkinton, Mass. For example, the first data storage system management application 32 can be a Navisphere Manager application configured to manage and monitor the data storage system 22 and the second data storage system management application 34 can be an NST application configured to update, install, and maintain hardware and applications associated with the data storage system 22.

In use, to manage inter-process communication between data storage system management applications 32, 34 the controller 24 of the client device 20 is configured to establish an inter-process communication channel 35 between the first and second data storage system management applications 32, 34. In use, the inter-process communication channel 35 allows the first and second data storage system management applications 32, 34 to exchange data storage system information 36 with each other. As will be described in detail below, the data storage system management applications 32, 34 utilize the data storage system information 36 to establish communication with the data storage system 22 in order to monitor and manage various aspects of the data storage system 22.

In one arrangement, the controller 24 of the client device 20 stores an application for managing inter-process communication between data storage system management applications 32, 34. The inter-process communication management application installs on the client device 20 from a computer program product 44. In some arrangements, the computer program product 44 is available in a standard off-the-shelf form such as a shrink wrap package (e.g., CD-ROMs, diskettes, tapes, etc.). In other arrangements, the computer program product 44 is available in a different form, such downloadable online media. When performed on the controller 24 of the client device 20, the inter-process communication management application causes the client device 20 to establish and manage inter-process communication between the first and second data storage system management applications 32, 34.

Figure 2:
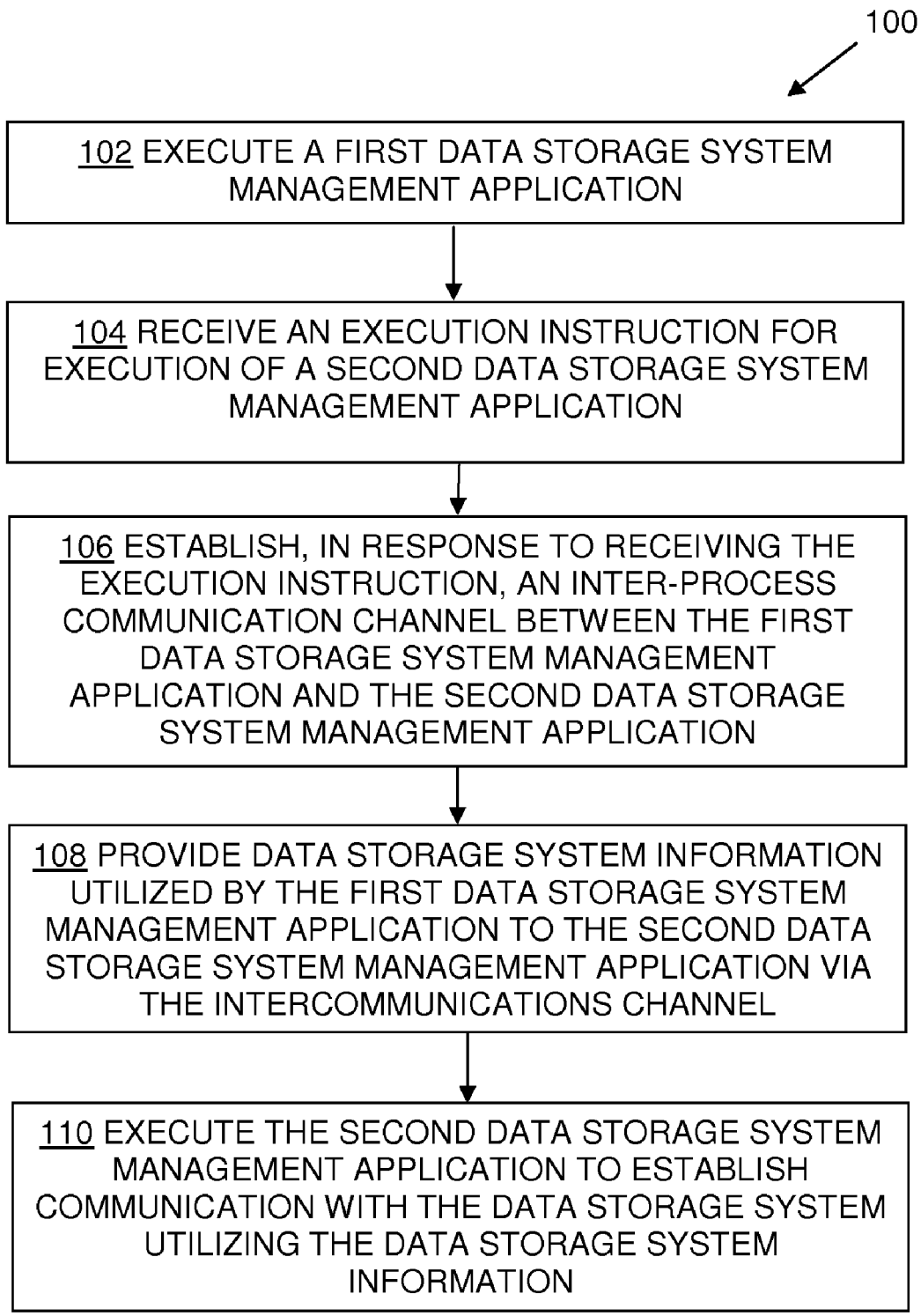
FIG. 2 is a flowchart that illustrates a procedure performed by a client device of the data storage environment of FIG. 1.

FIG. 2 is a flowchart 100 that illustrates a procedure performed by the client device 20 when managing data storage system management applications, such as first and second data storage system management applications 32, 34.

In step 102, the client device 20 executes a first data storage system management application 32. For example, with reference to FIG. 1, assume a user initiates execution of the first data storage system management application 32, such as Navisphere Manager. During the execution process, the client device 20 requests the user to enter data storage information 36, such as navigation information 38 (e.g., an Internet Protocol address associated with the data storage system 22) and security information 40 (e.g., security credentials such as a secure username and an encrypted password). Upon receiving the data storage information 36, the client device 20 utilizes the data storage information 36 to establish communication 37 between the first data storage system management application 32 and the data storage system 22. With the establishment of the communication 37, the client device 20 allows the user to manage and monitor the data storage system 22 through the first data storage system management application 32. For example, the client device 20 provides a graphical user interface (GUI) 42 associated with the first data storage system management application 32 via a display 30 to allow the user to navigate a variety of functions associated with management of the data storage system 22 using the first data storage system management application 32.

Returning to FIG. 2, in step 104, the client device 20 receives an execution instruction 46 for execution of a second data storage system management application 34. While the client device 20 can receive the execution instruction 46 in a variety of ways, in one arrangement, the client device 20 receives the execution instruction 46 via the first data storage system management application 32. For example, with reference to FIG. 1, the GUI 42 associated with the first data storage system management application 32 provides an action component 33, such as a link, button, screen hot-spot, etc., via the display 30 that allows a user to navigate to at least a portion of the second data storage system management application 34, such as a "Disk Replacement Using Application2" portion of the application 34. When the user executes the action component 33, such as by clicking on the action component 33 using a mouse controller (not shown), the first data storage system management application 32 generates the execution instruction 46 and provides the execution instruction 46 to the client device 20 to initiate execution of the second data storage system management application 34

Returning to FIG. 2, in step 106, the client device 20 establishes, in response to receiving the execution instruction 46, an inter-process communication channel 35 between the first data storage system management application 32 and the second data storage system management application 34. As indicated above, the inter-process communication channel 35 allows the first and second data storage system management applications 32, 34 to exchange data storage system information 36 with each other. While the client device 20 can establish the inter-process communication channel 35 in a variety of ways, in one arrangement the client device 20 sets a flag in the first data storage system management application 32 to indicate that a child application, such as the second data storage system management application 34, is configured to receive data from the parent or first data storage system management application 32.

In step 108, the client device 20 provides data storage system information 36 utilized by the first data storage system management application 32 to the second data storage system management application 34 via the intercommunications channel 35. For example, as indicated above and with reference to FIG. 1, the first data storage system management application 32 has associated data storage information 36, such as navigation information 38 (e.g., an Internet Protocol address associated with the data storage system 22) and security information 40 (e.g., security credentials such as a secure username and an encrypted password), such as entered by the user. With the intercommunications channel 35 established between the first data storage system management application 32 and the second data storage system management application 34, the client device causes the first data storage system management application 32 to transfer the previously-entered data storage information 36 to the second storage system management application 34.

Returning to FIG. 2, in step 108, the client device 20 executes the second data storage system management application 34 to establish communication with the data storage system 22 utilizing the data storage system information 36. In one arrangement, when launching the second data storage system management application 34, the client device uses the data storage system information 36 to establish a communication channel 46 between the second data storage system management application 34 and the data storage system. For example, the client device 20 utilizes the navigation information 38, such as an Internet Protocol address associated with the data storage system 22, to initiate a communication session between the second data storage system management application 34 and the data storage system 22. The client device 20 then utilizes the security information 40, such as a secure username and an encrypted password, to validate the second data storage system management application 34 to the data storage system 22, such as via an authentication procedure, and to establish communication 48 between the second data storage system management application 34 and the data storage system 22.

With the establishment of the communication 48, the client device 20 allows the user to manage and monitor the data storage system 22 (e.g., such as via the "Disk Replacement Using Application2" portion of the second application 34) through the second data storage system management application 34 while maintaining operation of the first data storage system management application 32. For example, the client device 20 provides a graphical user interface (GUI) 50 associated with the second data storage system management application 34 via the display 30 to allow the user to navigate a variety of functions associated with management of the data storage system 22 using the second data storage system management application 34.

With respect to conventional data storage environments, in the case where the user wants to launch related but separate data storage system management applications the user must minimize or close one application before launching the second application. By contrast to conventional data storage environment, in the present data storage environment 10 that includes multiple data storage system management applications based on a common code infrastructure, the client device 20 establishes an inter-process communication channel 35 between data storage system management applications 32, 34. The inter-process communication channel 35 allows navigation 38 and security 40 information commands to be passed from the primary application 32 to the secondary application 34. This allows one storage system management application, such as the first data storage system management application 32 to execute and run a second storage system management application, such as the second data storage system management application 34. Additionally, with such a configuration, the client device 20 allows a user to launch a family of applications, such as data storage system management applications 32, 34, without having to close or minimize existing applications and without having to re-enter or re-provide secure credentials used in the primary application. As such the client device provides the user with a relatively better ease-of-use experience relative to conventional data storage environments.

In one arrangement, when the client device 20 executes both the first and second data storage system management applications 32, 34, the client device 20 provides an end user with the ability to navigate between the applications 32, 34. For example, with reference to FIG. 1, when executing both the first and second data storage system management applications 32, 34 the client device 20 can display a GUI 42 associated with the first data storage system management application 32 via display 30. In the case where the user wants to re-navigate to the second data storage system management application 34, such as the "Disk Replacement Using Application2" portion of the second application 34, the user can provide a subsequent execution instruction 46 to the client device 20 through the first data storage system management application via the GUI 42. For example, the user can activate the action component 33, using a mouse controller. In response the, first data storage system management application 32 generates the execution instruction 46 and provides the execution instruction 46 to the client device 20.

In response to receiving the execution instruction 46, the client device 20 detects if the application 34 associated with the execution instruction is currently being executed. In the case where the client device 20 is in the process of executing the application, the client device 20 navigates the user to the second data storage system management application 34. For example, in one arrangement, the client device 20 navigates from the GUI 42 of the first data storage system management application 32 to the GUI 50 associated with the second data storage system management application 34, to allow the user to access the application 34 or a portion of the application 34. By allowing navigation from a first management application 32 to a second management application 34 while executing both management applications 32, 34, the client device avoids launching new instances of already executing applications.

Figure 3:
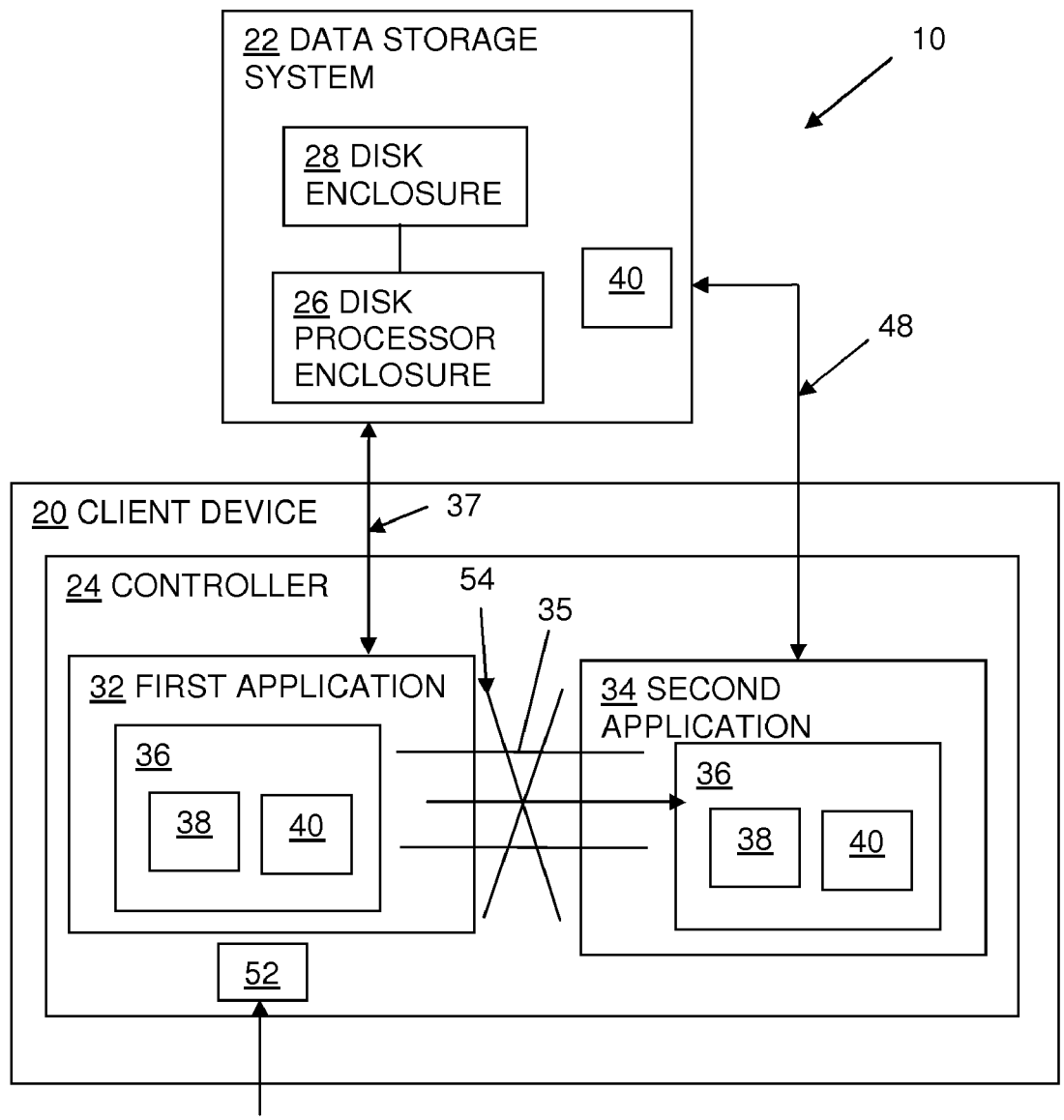
FIG. 3 illustrates a schematic representation of the client device of the data storage environment of FIG. 1, according to one embodiment.

With reference to FIG. 3, in one arrangement, the client device 20 is configured to terminate the inter-process communication channel 35 between the first and second data storage system management applications 32, 34. For example, in certain cases, it can be advantageous for the client device 20 to execute the first and second management applications 32 and 34 as standalone applications.

During operation, the client device 20 can receive a termination command 52, such as provided to the client device 20 by an end user. In response to receiving the termination command 52, the client device 20 terminates 54 the inter-process communication channel 35 between the first data storage system management application 32 and the second data storage system management application 32. For example, the client device 20 resets a flag in the first data storage system management application 32 to indicate that a child application, such as the second data storage system management application 34, is configured to receive data from an external source other than the first data storage system management application 32. Following termination of the inter-process communication channel 35 between the applications 32, 34, the client device 20 continues to execute the first and second data storage system management applications 32, 34, albeit as standalone applications.

While the client device 20 is configured to the inter-process communication channel 35 between the first and second data storage system management applications 32, 34, in one arrangement, the client device is also configured to terminate one of the management applications 32, 34 while allowing continued execution of the non terminated management application.

Figure 4:
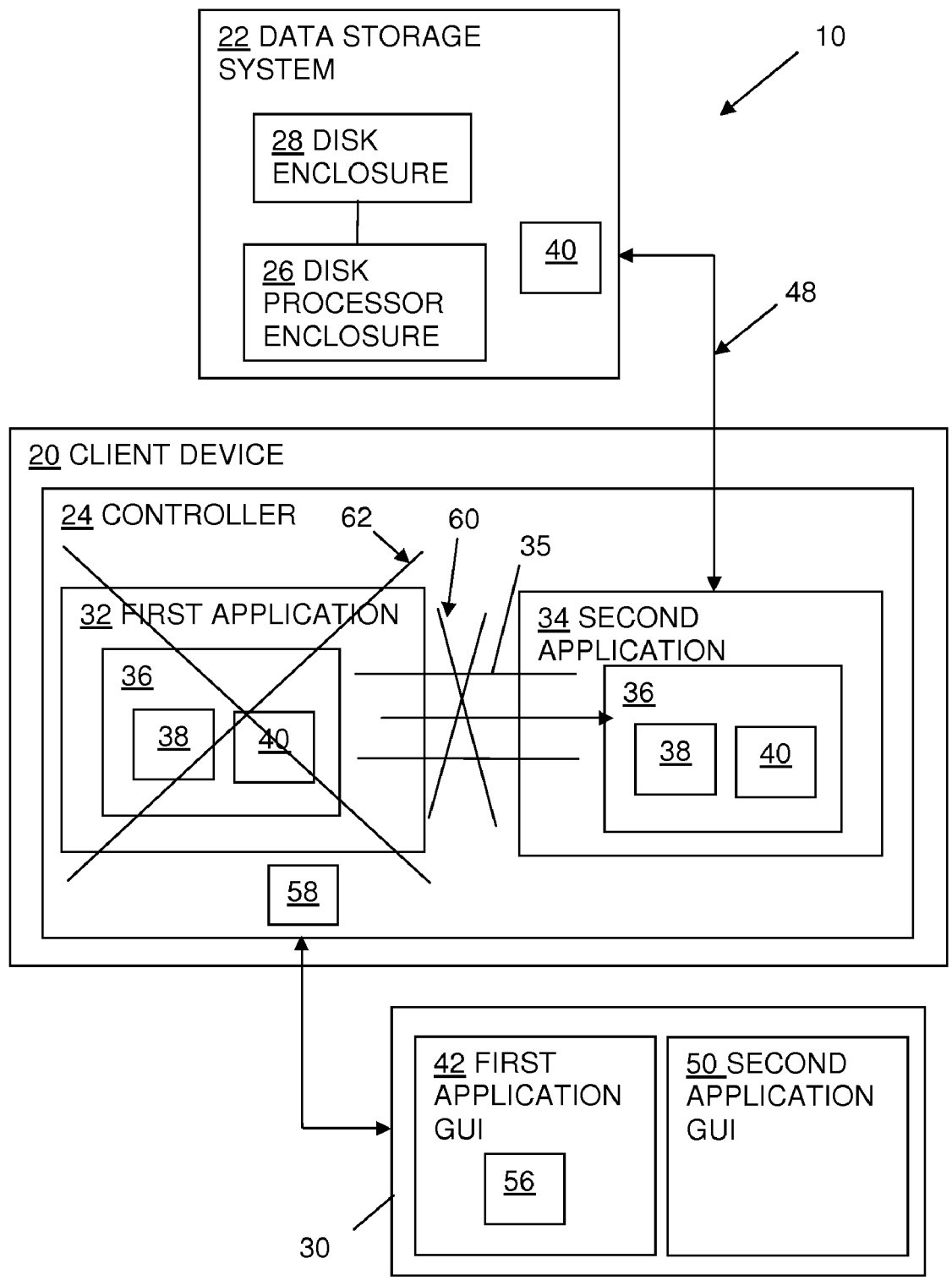
FIG. 4 illustrates a schematic representation of the client device of the data storage environment of FIG. 1, according to one embodiment.

In one arrangement, with reference to FIG. 4, to initiate the termination process, the client device 20 receives an application termination instruction 58, such as provided to the client device 20 by an end user. For example, assume the user wants to terminate the first data storage system management application 32. In such a case, the user can utilize the GUI 42 associated with the first data storage system management application 32 and activate an application termination component 56 to generate and transmit the application termination instruction 58 to the client device 20.

In response to receiving the termination instruction 58, the client device 20 terminates 60 the inter-process communication channel 35 between the first data storage system management application 32 and the second data storage system management application 32, as described above. Following termination of the inter-process communication channel 35 between the applications 32, 34, the client device 20 continues to execute the second data storage system management application 34 as standalone application. Next, the client device 20 terminates 62 operation of the selected first data storage system management application 32. With such a configuration, termination of the first data storage system management application 32 does not affect the operation of the second data storage system management application 34. In such a case the end user can continue using the active second management application 34 as a standalone application.

While various embodiments of the invention have been particularly shown and described, it will be understood by those skilled in the art that various changes in form and details may be made therein without departing from the spirit and scope of the invention as defined by the appended claims.

For example, as indicated above, the first data storage system management application 32 is configured to provide data storage system information 36 to the second data storage system management application 34 via the inter-process communication channel 35. Such description is by way of example only. In one arrangement, the inter-process communication channel 35 is configured as a two-way asynchronous communication channel and, as such, is bidirectional. Accordingly, the second data storage system management application 34 can exchange information, such as data storage information 36 with the first data storage system management application 32. Additionally, because the inter-process communication channel 35 is configured bidirectional, the second storage system management application 34 can exchange other information, such as status update information with the first storage system management application 32 and vice versa.

As described above and as indicated in FIG. 4, termination of the first data storage system management application 32 does not affect the operation of the second data storage system management application 34. Such description is by way of example only. In one arrangement, termination of the second data storage system management application 34 also does not affect the operation of the first data storage system management application 32.

What is claimed is:

1. A method for managing data storage system management applications, comprising
   executing, by a client device, a first data storage system management application;
   receiving, by the client device, an execution instruction for execution of a second data storage system management application;
   establishing, by the client device and in response to receiving the execution instruction, an inter-process communication channel between the first data storage system management application and the second data storage system management application;
   providing, by the client device, data storage system information utilized by the first data storage system management application to the second data storage system management application via the intercommunications channel; and
   executing, by the client device, the second data storage system management application to establish communication with the data storage system utilizing the data storage system information.

2. The method of claim 1, wherein providing, by the client device, data storage system information utilized by the first data storage system management application to the second data storage system management application via the inter-process communication channel comprises providing, by the client device, navigation information related to the data storage system and security information relating to the data storage system, utilized by the first data storage system management application, to the second data storage system management application via the intercommunications channel.

3. The method of claim 2, wherein providing, by the client device, navigation information related to the data storage system and security information relating to the data storage system, utilized by the first data storage system management application, to the second data storage system management application via the inter-process communication channel comprises providing, by the client device, an Internet Protocol address associated with the data storage system and a security credential associated with the data storage system, a utilized by the first data storage system management application, to the second data storage system management application via the intercommunications channel.

4. The method of claim 3, wherein executing, by the client device, the second data storage system management application to establish communication with the data storage system utilizing the data storage system information, comprises:
　establishing, by the client device and on behalf of the second data storage system management application, a communication channel with the data storage system using the Internet Protocol address; and
　validating, by the client device, the second data storage system management application to the data storage system using the security credential.

5. The method of claim 1, comprising:
　terminating, by the client device, the inter-process communication channel between the first data storage system management application and the second data storage system management application; and
　maintaining, by the client device, execution of the first data storage system management application and the second data storage system management application following termination of the intercommunications channel.

6. The method of claim 1, comprising:
　receiving, by the client device, a termination instruction configured to terminate execution of a selected one of the first data storage system management application and the second data storage system management application;
　terminating, by the client device, operation of the selected one of the first data storage system management application and the second data storage system management application; and
　maintaining, by the client device, operation of the non-selected one of the first data storage system management application and the second data storage system management application.

7. The method of claim 1, wherein:
　receiving, by the client device, the execution instruction for execution of the second data storage system management application comprises receiving, by the client device, the execution instruction for execution of the second data storage system management application in response to execution of an action component via the first data storage system management application.

8. The method of claim 7, comprising:
　receiving, by the client device, a subsequent execution instruction for the second data storage system management application through the first data storage system management application via a graphical user interface associated with the first data storage system management application; and
　navigating, by the client device, to a graphical user interface associated with the second data storage system management application from graphical user interface associated with the first data storage system management application.

9. The method of claim 1, wherein executing, by the client device, the second data storage system management application to establish communication with the data storage system utilizing the data storage system information comprises executing, by the client device, the second data storage system management application to establish communication with the data storage system utilizing the data storage system information while maintaining operation of the first data storage system management application.

10. An apparatus, comprising:
　at least one communications interface; and
　a controller which includes a processor and memory, the controller being electrically coupled to the at least one communications interface wherein the controller is configured to:
　execute a first data storage system management application;
　receive an execution instruction for execution of a second data storage system management application;
　establish, in response to receiving the execution instruction, an inter-process communication channel between the first data storage system management application and the second data storage system management application;
　provide data storage system information utilized by the first data storage system management application to the second data storage system management application via the intercommunications channel; and
　execute the second data storage system management application to establish communication with the data storage system utilizing the data storage system information.

11. The apparatus of claim 10, wherein when providing data storage system information utilized by the first data storage system management application to the second data storage system management application via the inter-process communication channel the controller is configured to provide navigation information related to the data storage system and security information relating to the data storage system, utilized by the first data storage system management application, to the second data storage system management application via the intercommunications channel.

12. The apparatus of claim 11, wherein when providing navigation information related to the data storage system and security information relating to the data storage system, utilized by the first data storage system management application, to the second data storage system management application via the inter-process communication channel the controller is configured to provide an Internet Protocol address associated with the data storage system and a security credential associated with the data storage system, a utilized by the first data storage system management application, to the second data storage system management application via the intercommunications channel.

13. The apparatus of claim 12, wherein when executing the second data storage system management application to establish communication with the data storage system utilizing the data storage system information, the controller is configured to:
　establish on behalf of the second data storage system management application a communication channel with the data storage system using the Internet Protocol address; and
　validate the second data storage system management application to the data storage system using the security credential.

14. The apparatus of claim 10, wherein the controller is configured to:
  terminate the inter-process communication channel between the first data storage system management application and the second data storage system management application; and
  maintain execution of the first data storage system management application and the second data storage system management application following termination of the intercommunications channel.

15. The apparatus of claim 10, wherein the controller is configured to:
  receive a termination instruction configured to terminate execution of a selected one of the first data storage system management application and the second data storage system management application;
  terminate operation of the selected one of the first data storage system management application and the second data storage system management application; and
  maintain operation of the non-selected one of the first data storage system management application and the second data storage system management application.

16. The apparatus of claim 10, wherein when receiving the execution instruction for execution of the second data storage system management application, the controller is configured to receive the execution instruction for execution of the second data storage system management application in response to execution of an action component via the first data storage system management application.

17. The apparatus of claim 16, wherein the controller is configured to:
  receive a subsequent execution instruction for the second data storage system management application through the first data storage system management application via a graphical user interface associated with the first data storage system management application; and
  navigate to a graphical user interface associated with the second data storage system management application from graphical user interface associated with the first data storage system management application.

18. The apparatus of claim 10, wherein the controller is configured to, when executing the second data storage system management application to establish communication with the data storage system utilizing the data storage system information, execute the second data storage system management application to establish communication with the data storage system utilizing the data storage system information while maintaining operation of the first data storage system management application.

19. A computer program product having a non-transitory computer-readable storage medium including computer program logic encoded thereon that, when performed on a controller of an apparatus causes the apparatus to:
  execute a first data storage system management application;
  receive an execution instruction for execution of a second data storage system management application;
  establish, in response to receiving the execution instruction, an inter-process communication channel between the first data storage system management application and the second data storage system management application;
  provide data storage system information utilized by the first data storage system management application to the second data storage system management application via the intercommunications channel; and
  execute the second data storage system management application to establish communication with the data storage system utilizing the data storage system information.

20. A computer program product as in claim 19 wherein the apparatus, when providing the data storage system information utilized by the first data storage system management application to the second data storage system management application via the inter-process communication channel, provides navigation information related to the data storage system and security information relating to the data storage system, utilized by the first data storage system management application, to the second data storage system management application via the intercommunications channel.

* * * * *